United States Patent
Lalsangi et al.

(10) Patent No.: US 10,693,955 B2
(45) Date of Patent: Jun. 23, 2020

(54) TECHNIQUES FOR SAN STORAGE CLUSTER SYNCHRONOUS DISASTER RECOVERY

(71) Applicant: NETAPP, INC., Sunnyvale, CA (US)

(72) Inventors: Raj Lalsangi, Cary, NC (US); Pramod John Mathew, Bangalore (IN); Perumal Govindan Deivapalan, Bangalore (IN); Santosh Rao, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 149 days.

(21) Appl. No.: 14/530,039

(22) Filed: Oct. 31, 2014

(65) Prior Publication Data
US 2015/0172111 A1  Jun. 18, 2015

Related U.S. Application Data

(60) Provisional application No. 61/916,176, filed on Dec. 14, 2013.

(51) Int. Cl.
| | |
|---|---|
| *H04L 29/08* | (2006.01) |
| *H04L 12/24* | (2006.01) |
| *H04L 29/14* | (2006.01) |
| *H04L 29/06* | (2006.01) |
| *H04L 12/26* | (2006.01) |

(52) U.S. Cl.
CPC ...... *H04L 67/1042* (2013.01); *H04L 41/0846* (2013.01); *H04L 67/1095* (2013.01); *H04L 67/1097* (2013.01); *H04L 67/42* (2013.01); *H04L 69/40* (2013.01); *H04L 43/10* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 6,609,213 B1* | 8/2003 | Nguyen | ............ | G06F 11/2025 709/223 |
| 6,779,003 B1* | 8/2004 | Midgley | ............ | G06F 11/2071 |
| 7,228,460 B2* | 6/2007 | Pomaranski | ........ | H04L 41/0668 714/43 |
| 7,475,280 B1* | 1/2009 | Schlomer | ............ | G06F 11/2046 714/6.1 |
| 7,617,369 B1* | 11/2009 | Bezbaruah | .......... | G06F 11/2074 707/999.2 |

(Continued)

*Primary Examiner* — Thomas J Dailey
(74) *Attorney, Agent, or Firm* — Klein, O'Neill & Singh, LLP

(57) ABSTRACT

Improved techniques for disaster recovery of storage service accessible through storage area networks are disclosed. Embodiments include establishing peer relationships between nodes of primary and secondary computing clusters. Configuration information is replicated in near synchronous manner from a primary cluster and used to configure a secondary cluster in a similar manner. Host data is replicated in synchronous manner for all the storage devices and LUNs within them. The secondary cluster is kept updated continuously with configuration information and user data in LUNs on storage devices such that a host may be served data from the secondary cluster when the primary cluster experiences a disaster or failure. Other embodiments are described and claimed.

20 Claims, 12 Drawing Sheets

(56) References Cited

U.S. PATENT DOCUMENTS

| | | | |
|---|---|---|---|
| 2002/0188891 A1* | 12/2002 | McBrearty | G06F 11/2097 |
| | | | 714/42 |
| 2005/0283658 A1* | 12/2005 | Clark | G06F 11/203 |
| | | | 714/11 |
| 2009/0271412 A1* | 10/2009 | Lacapra | G06F 17/30206 |
| 2010/0153350 A1* | 6/2010 | Yahalom | G06F 11/2094 |
| | | | 707/694 |
| 2010/0223428 A1* | 9/2010 | Wayda | G06F 11/1435 |
| | | | 711/114 |
| 2013/0242718 A1* | 9/2013 | Zhang | H04L 12/4633 |
| | | | 370/218 |
| 2013/0311427 A1* | 11/2013 | Patel | G06F 17/30312 |
| | | | 707/610 |

\* cited by examiner

Create relationship between primary and secondary clusters.

202

↓

Establish peer relationship between Vservers on primary and secondary clusters.

204

↓

Capture and transfer configuration information from primary to secondary cluster.

206

↓

Update secondary cluster with any detected changes to primary cluster.

Storage Medium 1000

Computer Executable Instructions ized data storage and network, and may appear as a single dedicated server to its clients over storage area network. A cluster may include at least one Vserver to serve data, but many more Vservers may be used in some cases. For example, multiple Vservers may coexist in a single cluster without being bound to any node in a cluster. When a cluster fails due to a disaster, for example, data may be unavailable to the one or more host devices. Thus, a need exists for techniques to provide fast and efficient disaster recovery operations in the case of failure cluster wide failure.

TECHNIQUES FOR SAN STORAGE CLUSTER SYNCHRONOUS DISASTER RECOVERY

RELATED APPLICATION

This application claims the benefit of priority under 35 U.S.C. § 119(e) to U.S. Provisional Application No. 61/916,176, filed Dec. 14, 2013, which is hereby incorporated by reference in its entirety.

BACKGROUND

A storage cluster may include one or more virtual storage servers, or Vservers, which may be used to serve data to one or more host devices, or clients. A Vserver may contain one or more data volumes and one or more logical interfaces, or LIFs, through which it may serve data to one or more host devices. A Vserver may securely isolate shared virtualized data storage and network, and may appear as a single dedicated server to its clients over storage area network. A cluster may include at least one Vserver to serve data, but many more Vservers may be used in some cases. For example, multiple Vservers may coexist in a single cluster without being bound to any node in a cluster. When a cluster fails due to a disaster, for example, data may be unavailable to the one or more host devices. Thus, a need exists for techniques to provide fast and efficient disaster recovery operations in the case of failure cluster wide failure.

BRIEF DESCRIPTION OF THE DRAWINGS

FIG. 2 illustrates an embodiment of a logic flow.
FIG. 10 illustrates an embodiment of a storage medium.

DETAILED DESCRIPTION

Figure 1:
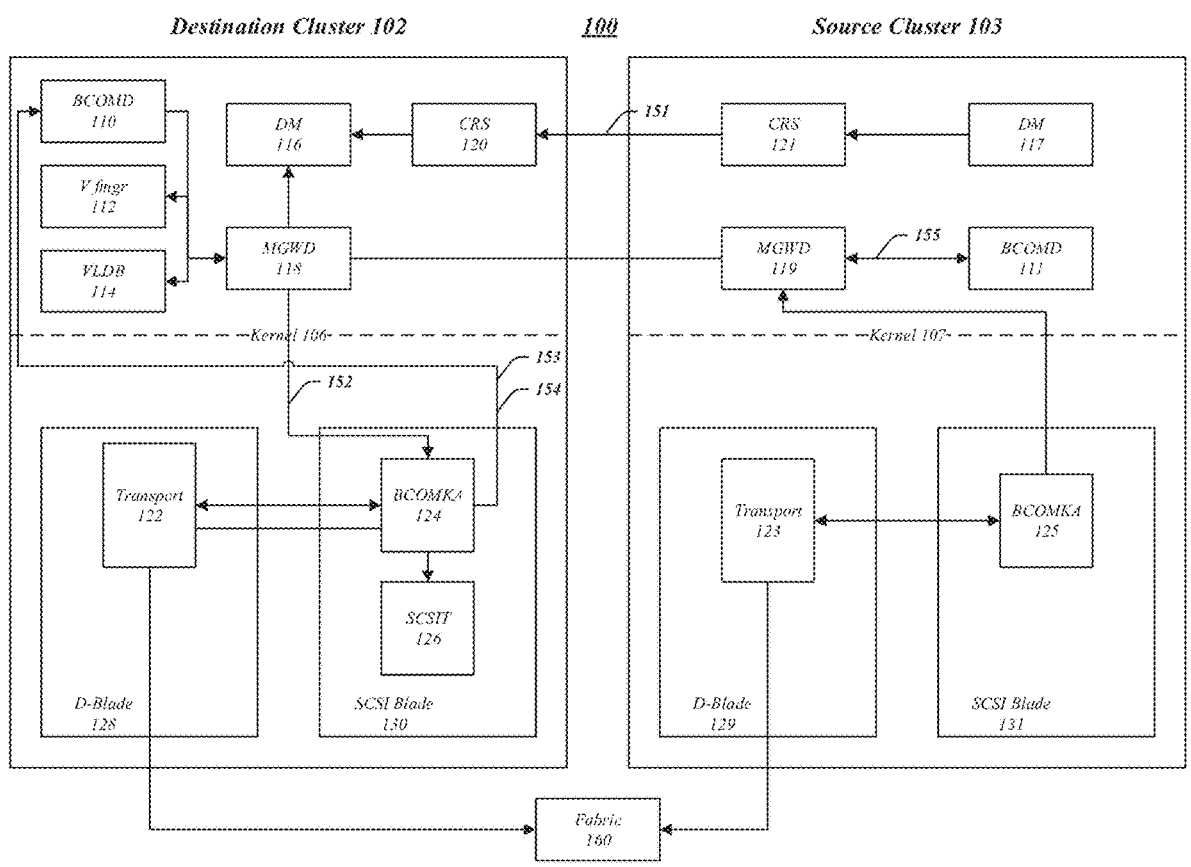
FIG. 1 illustrates an embodiment of a storage area network.

Various embodiments may be generally directed to techniques for storage area network (SAN) storage cluster synchronous disaster recovery. In various embodiments, the source storage system and the target storage system may each have one or more storage devices and store information in logical units, e.g., source logical units and target logical units. Further, each of the storage systems may include one or more cluster nodes or controllers coupled with the storage devices to form the storage system. In various embodiments, the cluster nodes may be separate computing devices and/or controllers for processing read/write requests for the storage system.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The target storage system, in a different site, may be introduced into a preexisting storage system environment, such as a SAN environment including the source storage system. The importation of information from the source storage system and source logical unit to the target storage system and target logical unit may be initialized. More specifically, the target logical unit may bind with the source logical unit through one or more cluster nodes and information may be copied from the source logical unit to the target logical unit on a block-by-block basis.

As previously discussed, the storage systems may include one or more cluster nodes. For example, the target storage system may include four cluster nodes, where each cluster node is paired with another cluster node to form two pairs of cluster nodes. As will be discussed in more detail below, the paired cluster nodes may form a high availability cluster node system such that if one cluster node fails, its paired cluster node can takeover processing from the failed cluster node. Further, a cluster node may giveback processing to its paired cluster node when it comes back online.

During a failure, takeover or giveback event, one or more modules or components of the storage system may handle the event such that the failure is transparent to a host device and the importation of data does not have to restart from the beginning. For example, when a cluster node fails, the importation processing may stop or be suspended until the paired cluster node assumes responsibility of the processes on the failed cluster node. In addition, any logical units associated with failed cluster node may be associated with the new cluster node, processes executing on the failed cluster node may be initialized and operate on the paired cluster node and configuration information may be updated in memory or a data store. More specifically, configuration or identification information may be updated such that host device read/write requests are sent to the correct cluster node, the paired cluster node is identified as the current cluster node handling the importation processing and the location of the logical units associated with the paired cluster node is updated.

The described techniques may provide a disaster recovery (DR) solution for one or more Vservers within one or more clusters of a SAN. The solution may apply to entire clusters or individual Vservers within a cluster. In an example, a disaster may occur when one or more Vservers fail and are unable to serve data to the appropriate hosts. In described embodiments, a secondary Vserver, which has been configured as a backup to a primary Vserver, may be activated during a switchover operation. In this manner, when failure occurs, the secondary Vserver may be used to ensure that hosts experience little to no disruption in retrieving data. The secondary Vserver may be configured such that hosts see little to no change at all, and may even be able to use the same volumes and logical units (LUNS), for example.

In some embodiments, a secondary Vserver may replicate many configuration items, with identities preserved, of a primary Vserver known to a host device. In this manner, a host device may access a secondary Vserver in a disaster situation without experiencing delay due to the disaster. Some identifiers retained by a secondary cluster may include, but are not limited to, SCSI target device WWID, SCSI target WWNN (for FC) and IQN (for iSCSI), LIF WWPN (for FC) and tpgtag (for iSCSI), the LIF WWPN (for FC), tpgtag (for iSCSI), rtpid, a LUN serial number, ALUA TPG IDs, and/or a LUN ID. Since these identities may be preserved, and replicated between primary and secondary clusters, any data object with a unique identify, such as a volume MSID, LIFs WWPN, or LUN serial number, may not be visible to a host in the primary and secondary cluster simultaneously. To accomplish this, a secondary cluster or Vserver may operate in a restricted state in which it does not serve data. LIFs associated with a secondary Vserver may only be made available when disaster occurs with respect to a primary Vserver.

To create a seamless experience for a host device accessing data, connectivity between a requesting device, or initiator, and LUNs of a logical storage volume may be retained in a secondary Vserver. In some embodiments, the LUNs may uniquely identify the logical storage volume within the context of a virtual storage array. In some embodiments, an initiator-target-nexus (i-t-n) may identify a target port and may be retained in both the primary and secondary Vserver. In a Fibre Channel (FC) environment, a target port may be identified using a World Wide Port Name (WWPN). In an iSCSI environment, a target port may be identified using an iSCSI Qualified Name (IQN) and a Target Portal Group Tag (TPGT). Initiators may use the target port information for identification. Thus, a host may not experience data interruption after a switchover operation, since a LUN serial number and i-t-n value are retained in both primary and secondary V servers.

FIG. 1 illustrates an embodiment of an operating environment 100 such as may be associated with various embodiments. As described above, a secondary cluster may be configured to mimic a primary cluster such that, during failure, a switchover operation may be performed in a relatively short period of time and hosts requesting data may experience little to no change due to the failure. To accomplish this, some embodiments may configure a SAN to retain the identities of certain data, as discussed above and below, and may perform other configurations and metadata handling. Each cluster within a SAN may be designated as a source/primary or destination/secondary and may include one or more modules. Each module may comprise software and/or hardware, which may include software instructions that, when executed by hardware, such as a processor, configure hardware within the cluster.

For example, logical unit (LU) data within SAN 100 may be classified into the following types: LU data, LU configuration data, and LU metadata. LU data may comprise the host addressable portion of a LU. LU configuration data may include LUN specific attributes such as LUN serial number, admin state, or device identification. Other configuration data may also be included based upon different implementations. LU configuration data may be stored in a stream linked off a base inode of a LUN and in an override storage module in an OOVC. LU configuration data may be modified using one or more management operations. LU metadata may include LUN path metadata, which may comprise persistent reservation, mode pages, and log pages. LU metadata may be stored in an OOVC.

As shown in FIG. 1, source cluster 103 may store data in one or more Vservers, which may be categorized within SAN 100 as host Vservers of subtype "sync-source." In an embodiment, source cluster 103 may be used to serve data prior to a disaster or failure of one or more components within source cluster 103. Also illustrated within FIG. 1 is destination cluster 102, which may host data using one or more Vservers categorized within SAN 100 as subtype "sync-destination." Destination cluster 102 may be used to serve data to one or more hosts after a disaster or failure of one or more components within source cluster 103. D-Blades 128, 129 and SCSI Blades 130, 131 may store and execute one or more modules, such as transport modules, BCOMKA modules, and SCSIT modules, for example.

BCOMD 110, 111 may be a Mhost application server for SAN 100 that manages SAN specific configuration. In addition, BCOMD 110 and 11 may provide a list of SAN tables and table attributes that may be replicated using a configuration replication module (CRS). In some embodiments, BCOM managed objects may include, but are not limited to, the following as shown in Table 1:

TABLE 1

| UI/Frontend Table Name | Backend Table Name |
|---|---|
| fcp | fcpConfig |
| fcp_nodename | fcpConfig |
| fcp_portname | fcpLifTable |
| fcp_wwpnalias | wwpnAliasConfig |
| igroup | igroupConfig, initiatorIgroup |
| iscsi | iscsiConfig |
| iscsi_nodename | iscsiConfig |
| iscsi_alias | iscsiConfig |
| iscsi_session | lif_group_table |
| iscsi_connection | lif_group_table |
| tpgroup | lif_group_table |
| iscsi_interface | iscsiInterfaceAccessConfig |
| iscsi_accesslist | iscsiInterfaceAccessConfig |
| iscsi_security | iscsiSecurityConfig |
| lun | vdiskIgroupMap |
| map | vdiskIgroupMap |
| portset | portsetConfig |
| iSCSI ISNS | isnsConfig |
| LUN VVOL | vdiskBind |

Within each managed object, one or more fields may be replicated. For example, for each of the following objects (represented by frontend names), the following fields may be replicated as shown in Table 2:

TABLE 2

| UI/Frontend Table Name | Replicated Fields |
|---|---|
| fcp | vserver, target-name, status-admin |
| fcp_nodename | target-name |
| fcp_portname | vserver, lif, wwpn |
| fcp_wwpnalias | vserver, alias, wwpn |
| igroup | vserver, igroup, protocol, ostype, portset, initiator, uuid, alua |
| iscsi | vserver, target-name, target-alias, status-admin |
| iscsi_nodename | target-name |
| iscsi_alias | target-alias |
| iscsi_session | iscsi session show |
| iscsi_connection | iscsi connection show |

TABLE 2-continued

| UI/Frontend Table Name | Replicated Fields |
|---|---|
| iscsi_interface | vserver, lif, enabled |
| iscsi_accesslist | vserver, initiator-name, lif, all |
| iscsi_security | vserver, initiator-name, auth-type, user-name, password, outbound-user-name, outbound-password, clear-outbound, auth-chap-policy |
| lun | vserver, path, volume, qtree, lun, uuid, vdiskId, igroup, lun-id, lun-id-assigned |
| map | vserver, path, volume, qtree, lun, igroup, ostype, protocol, lun-id |
| portset | vserver, portset, uuid, port-name, protocol |
| iSCSI ISNS | vserver, address, status-admin |
| LUN VVOL | vserver, protocol-endpoint-path, vvol-path, protocol-endpoint-identifier, secondary-lun-id, vserver-uuid, protocol-endpoint-msid, protocol-endpoint-vdisk-id, vvol-msid, vvol-vdisk-id, bind-id |

Further, BCOMD 110, 111 may stub out configuration operations in a setup phase to prevent cache population. Still further BCOMD 110, 111 may provide support for explicit Vserver join and BCOMKA cache population during switchover and switchback phases, change all necessary cluster scoped SAN IDs to a Vserver (e.g. tpgtag, alua tpgid), and provide support for specifying LIF identities, rtpid and alau tpgid at creation.

In an embodiment, Vfmgr module 112 may be configured to manage LIF configuration, such as a physical port on which the LIF is hosted, or LIF identities such as IQN and tpgtag and IP address. VLDB modules 114 may be configured to track the location of storage volumes with the cluster. DM modules 116 and 117 may be configured as director modules, which may coordinate the transfer of configuration changes due to an administrator changing a configuration. In addition, DM modules 116 and 117 may also handle recovering from errors during CRS transfer.

In an embodiment, MGWD module 118 may be used by a source Vserver to obtain a list of candidate ports that may be used to determine destination Vserver FC and iSCSI LIFs. MGWD module 118 may also provide an interator that will return a list of home-nodes and home-ports on which to determine the layout of destination Vserver SAN LIFs. To provide a LIF layout, MGWD module 118 may extract source Vserver configuration data and retrieve a list of FC and iSCSI LIFs along with their identities. MGWD module 118 may further extract destination Vserver configuration data, including IP ports in a destination Vserver's IPSpace. Still further, MGWD module 188 may be configured to provide customized methods for populating SAN RDB data at a destination cluster.

In an embodiment, MGWD module 119 may be used at a source cluster to obtain a primary Vserver's SAN identify, which may be either WWNN or IQN. MGWD 118, 119 may also be configured to obtain a list of SAN LIFs and identities, obtain fabric names through which a source Vserver's FCP LIFs are connected, and provide any necessary customized methods for extracting SAN RDB data at the source.

In some embodiment, CRS modules 120 and 121 may be configuration replication modules, which in some embodiments, are responsible for transferring the configuration changes from one cluster to another as and when they occur. The embodiments are not limited by this example.

In an embodiment, transport module 123 may obtain the name of one or more fabrics for the source Vserver's FC LIFs. Transport module 122 may be used to obtain the name of one or more fabrics for which destination cluster 102 LIFs are connected.

BCOMKA module 125 may be a blocks kernel agent, which may be used by SCSI blades to cache configuration information in the kernel 107. BCOMKA module 125 additionally may be configured for pass-through support for obtaining fabric names of the source Verserver's FC LIFs. BCOMKA module 124 may be a blocks kernel agent, which may be used by SCSI blades to cache configuration information in the kernel 106. BCOMKA module 124 may additionally be configured for pass-through support for obtaining fabric names through which a destination cluster's FC ports are connected. Further, BCOMKA module 124 may be configured to purge BCOMKA specific data during a switchback phase.

In an embodiment, SCSIT module 126 may be a SCSI target residing in the SCSI blade. SCSIT module 126 may be used in some embodiments to purge SCSIT specific data during a switchback phase.

In an embodiment, LIF placement may be performed via interface 151 by extracting relevant configuration information from the primary Vserver using CRS and/or cross cluster calls. In one example, a LIF placement algorithm may be used to determine an appropriate home-node and home-port for each SAN LIF created in a secondary, or source, cluster. The LIF placement algorithm, as described in more detail below, may use configuration information from the source and destination clusters, such as SAN LIF information, FC fabric information, or IP subnet information. Using this information, a LIF placement module may be used to identify the appropriate node and port for LIFs within a destination Vserver.

In an embodiment, interface 152 may be used to support LIF placement within a SAN. For example, relevant configuration information may be obtained from a secondary cluster, such as a list of home-nodes and home-ports, and may be returned. Other examples of relevant configuration information may include ports in a destination Vserver's IPspace (using a SCON API) and destination fabric names. This configuration information may be used to determine a list of available home-nodes and home-ports, which may be used in conjunction with a LIF placement algorithm.

Some embodiments may include an interface 153 used to populate a destination cluster in-memory cache. For example, in a switchover operation, a SAN API may be used to push SAN RDB data into a BCOMKA cache, SCSIT and transport to enable protocol access.

In an embodiment, one or more caches within a kernel may be purged after a switchback operation using interface 154. For example, in a switchback operation, a CRS may trigger a re-baseline, which may synchronize updates from a secondary cluster to a primary cluster. Once complete, a purge of the in-memory cache of a SAN may be initiated using one or more APIs within a SAN.

After a switchover operation, a host may access data from a secondary cluster via an interface of D-blade 128. In this example, it may be necessary to prevent LIFs from a primary cluster from coming online. If that were to occur, the host may begin accessing data from the host cluster after a switchover has already taken place.

In another embodiment, another interface, as illustrated, may be used to populate a SAN in-memory cache at a source cluster. A part of a switchback operation, a SAN API may be invoked on a primary cluster to push SAN RDB data into a BCOMKA cache, SCSIT, and Transport to enable protocol access.

Some embodiments may include an interface, as illustrated, for populating a SAN in-memory cache with LUN attributes. In this manner, LUN attributes may be shared across clusters. Once a volume is mounted, BCOMKA may pull the volume and LUN attributes from VDOM.

In another embodiment, to prevent initiators from seeing LUNs in batches, a SAN LIF bring-up, or activation, may wait until all mapped LUNs in the Vserver are online. BCOMKA may ensure that all LUN inventory has been processed before bring up, or activating, the LIFs.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 2 illustrates one embodiment of a logic flow 200, which may be representative of the operations executed by one or more embodiments described herein. At 202, a relationship may be created between primary and secondary clusters. The relationship may be automatically created by one or more software modules of a distributed computing system, or may be manually created by a system administrator.

At 204, a command, such as a "metrocluster" enable command, may be run. The command may be initiated by a software module or a system administrator. The command may be run on both a primary and secondary cluster, for example. Thereafter, any Vserver that is created within a primary cluster may be assigned a subtype of "sync-source" and any Vserver that is created within a secondary cluster may be assigned a subtype of "sync-destination." In some embodiments, such as those using MCC A/A, Vservers in the primary and secondary clusters may use both "sync-source" and "sync-destination" subtypes. For example, a Vserver created in a secondary cluster may be assigned a "sync-source" subtype with a Vserver in a destination cluster being assigned a subtype of "sync-destination."

At 206, configuration information may be captured from a primary cluster and transferred to corresponding nodes within a secondary cluster. Configuration information may include configuration discussed above and below, and may be used to establish a peer environment between Vservers within a primary cluster and Vservers within a secondary cluster, as illustrated above with respect to FIG. 1.

At 208, any changes made at a primary cluster may be updated in corresponding nodes of a secondary cluster. Using one or more software module, executed on, or between, the primary and secondary clusters, changes to configuration information, or stored data, on source Vservers may be synchronized to corresponding peer destination Vservers.

Figure 3:
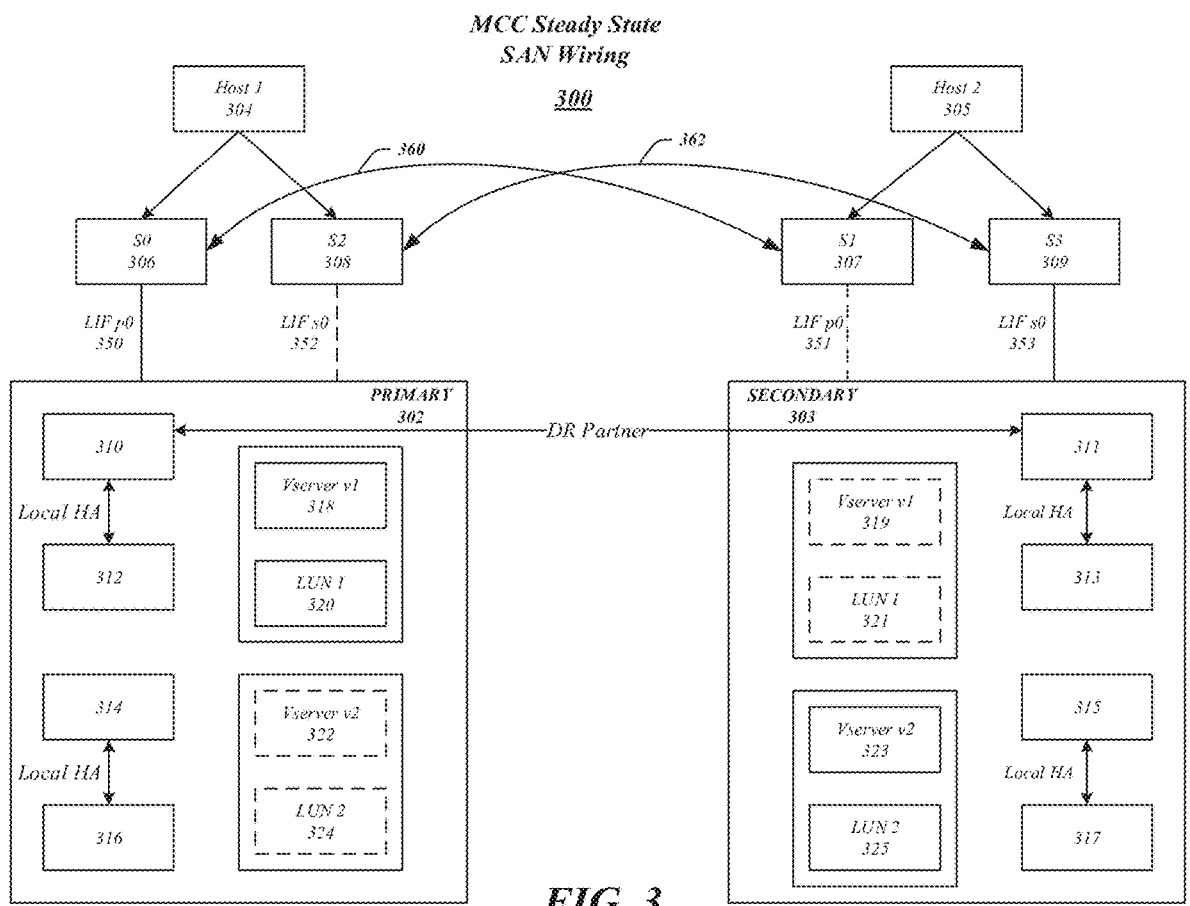
FIG. 3 illustrates an embodiment of a storage area network.

FIG. 3 illustrates a SAN 300 according to one embodiment. SAN 300 may be configured for disaster recovery, such that a primary cluster 302 may be peered with secondary cluster 303. SAN 300 may include host devices 304 and 305, which may be any type of computing system configured to execute one or more applications. Moreover, the host devices 304 and 305 may interact with primary cluster 302 and secondary cluster 303 in accordance with a client/server model of information delivery. That is, the host devices 304 and 305 may request the services of primary cluster 302 and secondary cluster 303, and the system may return the results of the services requested by the host, by exchanging packets over a network. Host devices 304 and 305 may issue packets including file-based access protocols, such as the Common Internet File System (CIFS) protocol or Network File System (NFS) protocol, over TCP/IP when accessing information in the form of files and directories. In addition, host devices 304 and 305 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Each of primary cluster 302 and secondary cluster 303 may include one or more nodes and Vservers, including cluster storage nodes 310-316 and 311-317 and Vservers 318 (including LUN 320), 322 (including LUN 324), 319 (including LUN 321), and 323 (including LUN 325). Cluster storage nodes 310-316 and 311-317 and Vservers 318, 322, 319, and 323 may be any computing device including a processor, processing circuitry, a controller, a storage controller, and so forth. Although FIG. 3 only illustrates four cluster storage nodes and four Vservers, various embodiments may include any number of cluster storage nodes and Vservers.

Each cluster can make some or all of the storage space on storage nodes 310-316 and 311 available to a corresponding host device, such as host devices 304 and 305, for example. Host devices may access cluster storage nodes using well-known protocols, such as Internet Small Computer System Interface (iSCSI), Fibre Channel Protocol (FCP), or Fibre Channel over Ethernet (FCoE). Cluster storage nodes may present or export data as logical units (LUNs), for example, to host devices 304 and 305 via interconnects 350-353 and switches 306-309. In some embodiments, a cluster node 310 can communicate with another cluster node 312 over a cluster interconnect, which can be implement, for example, as a Gigabit Ethernet switch.

In embodiments, the cluster nodes may be configured as high availability pairs (HA). More specifically, cluster nodes 310-312, 314-316, 311-313, and 315-317 may be paired as high availability pairs. The high availability pairs may provide a redundant failover capability for the storage system. In various embodiments, each of the cluster nodes may serve information independently of its paired node during normal operation. However, in the event of individual cluster node failures, one or more processes for processing data may transfer from the failing or failed cluster node to the surviving paired cluster node. The high availability pair configuration may protect against hardware failures, including the failure of network interface cards, Fiber Channel Arbitration loops, and shelf input/output modules.

In the high availability pair cluster node environment, each node may monitor the availability status of its partner by means of a heartbeat signal that may be transmitted between the cluster nodes through the interconnects. In various embodiments, the failure to receive a heartbeat signal over interconnects may indicate the paired cluster node has failed and trigger a failover or takeover event. In addition to the heartbeat signal, other information may be communicated between the paired cluster nodes such as, system time, and details concerning temporary disk unavailability due to pending disk firmware updates.

In an embodiment, cluster nodes may be paired with peer cluster nodes in a secondary storage system. For example, as illustrated, primary cluster 302 includes cluster node 310, which may be paired as a disaster recovery peer with cluster node 311 of secondary cluster 303.

As illustrated within FIG. 3, primary cluster 302 hosts Vserver 318 and secondary cluster 303 hosts Vserver 323, which are both designated as source servers. As illustrated, each of primary cluster 302 and secondary cluster 303 include destination Vservers 322 and 319. As indicated by dashed lines, these destination Vservers may be restricted during normal operation, which may restrict the access to them by a host. Data may not be served during this time and may only resume when a disaster recovery operation is performed and a switchover operation is initiated.

In an embodiment, hosts 304 and 305 may be connected to primary cluster 302 and secondary cluster 303, respectively, via pairs of redundant switches. For example, switches 306 and 308 may provide a connection between host 304 and primary cluster 302. Switches 307 and 309 may provide a connection between host 305 and secondary cluster 303. In addition, these switches may be interconnected via inter-switch link connections 360 and 362. Each Vserver may also have a series of one or more LIFs connected to the switches. As shown, LIF 350 is connected to switch 306, LIF 352 is connected to switch 308, LIF 351 is connected to switch 307, and LIF 353 is connected to switch 309. In an embodiment, LIF 352 may be used in conjunction with Vserver 322, and thus may be operationally shut down during periods of normal operation. Likewise, LIF 351, which may be associated with Vserver 323 may be operationally shut down during normal operation.

A SAN may be configured, as shown in FIG. 3, such that LUNs may be available to a host after a failure in a Vserver. This ability provides several advantages, which may include the ability to retain the identifies of specific Vserver SAN objects in a secondary Vserver, hosts may see the same LIFs in a secondary cluster as a previously used primary cluster without the need to change fabric or IP connectivity, zoning, or subnet configurations.

In some embodiments, an optional, but recommended, pre-discovery phase may be used to discover LUNs. A host may perform pre-discovery during an initial setup for disaster recovery, either by an administrator of a system, or software configured to do so. Connections 260 and 362 may be established and maintained between primary cluster 302 and secondary cluster 303. For example, host 304 may discover LUN2 325 via LIF s0 and connection 362 on secondary cluster 303. In a similar manner, host 305 may discover LUN1 320 in Vserver 318 via LIF p0 and connection 360 on primary cluster 302. In this manner, the appropriate information may be pre-discovered prior to a disaster recovery event. Pre-discovery of LUNs may obviate the need for hosts to attempt discovery after failure occurs. In addition, pre-discovery may increase the speed at which recovery may be made after a disaster event since no reboot may be required and LUN devices files may be already created.

In some embodiments, LIF placement is used to identify LIFs in a secondary cluster to achieve some of the advantages described above. For example, for each LIF within a SAN in a source Vserver, a LIF may be created in a destination Vserver. By way of example, for each LIF in primary cluster 302, a LIF may be created in secondary cluster 303. In this manner, upon a disaster or failure, hosts may see the same data without the need to reconfigure. In an exemplary embodiment, LIF settings may be maintained between clusters. A LIF identity, such as WWPN, tpgtag, rtpid, or ALUA tpgid may be maintained across clusters, for example.

Other requirements for LIF placement may include connecting each node within primary cluster 302 and secondary cluster 303 with a common fabric. In this manner, upon completion of a switchover operation, aggregates owned by a node in a primary cluster can easily be owned by a peer in a secondary cluster. In addition, FC LIFs may be zoned on WWPN.

A technique for LIF placement and management may be used within a SAN, such as SAN 300, to accomplish pairing and duplicating LIFs between a primary cluster 302 and secondary cluster 303. A software module, which may include some hardware elements, called an iterator, may be configured to return, for each source Vserver SAN LIF, a node and port on a destination Vserver for which a LIF with the same identify can be created. During a CRS replication phase, the iterator module may prior to SAN LIF creation. Further, the iterator may be configured to return an error if a suitable node cannot be found.

LIF placement, in some embodiments, may comprise two phases: configuration extraction phase and configuration validation phase. The extraction phase may extract necessary configuration information from a source Vserver, such as Vserver 318. For source Vservers in FC LIF placement, configuration may include LIF name, WWPN, adapter type (FC/CAN), rtpid, ALUA TPGID, or fabric name. For source Vservers in iSCSI LIF placement, configuration information may include LIF name, IP address, current tpgtag, default tpgtag, rtpif, ALUA TPGID, or adapter type. (e.g. Ethernet/ CNA). For destination Vservers or secondary clusters in FC LIF placement, configuration information may include a fabric name or type of adapter. For destination Vservers in iSCSI LIF placement, configuration information may include ports in a secondary cluster that are in the same source Vserver IPspace or a type of adapter. The embodiments are not limited by these examples.

The validation phase may use data from the extraction phase to identify source nodes and ports, which may be returned to a requestor. Some requirements may be imposed on these phases, particularly the validation phase. First, LUNs in a secondary Vserver may be required to have the same number of paths as LUNs in a primary Vserver. Second, LIF to node mapping may be required at a destination cluster. Among others, the following exemplary rules may be followed when placing LIFs, however, modifications to the below rules based upon different embodiments are possible:

A SAN may not extract source Vserver zoning information for LIF layouts.

LIF to adapter mappings may be retained at the destination Vserver. For example, if a FC LIF is on a FCoE/CNA adapter, the LIF with the same identity must use a FCoE/ CNA adapter. This may also be required for iSCSI LIFs.

The number of ALUA, AO, and ANO paths should be retained between destination and source Vservers.

For FC LIFs, a SAN may provide a list of home nodes and home ports using the fabric names as the deciding criterion.

For iSCSI LIFs, the sync-destination Vserver IPspace information may be used to determine the ports that are candidates for iSCSI LIF placement.

LIFs may be placed in a balanced manner from among identified candidate nodes and ports.

Figure 4:
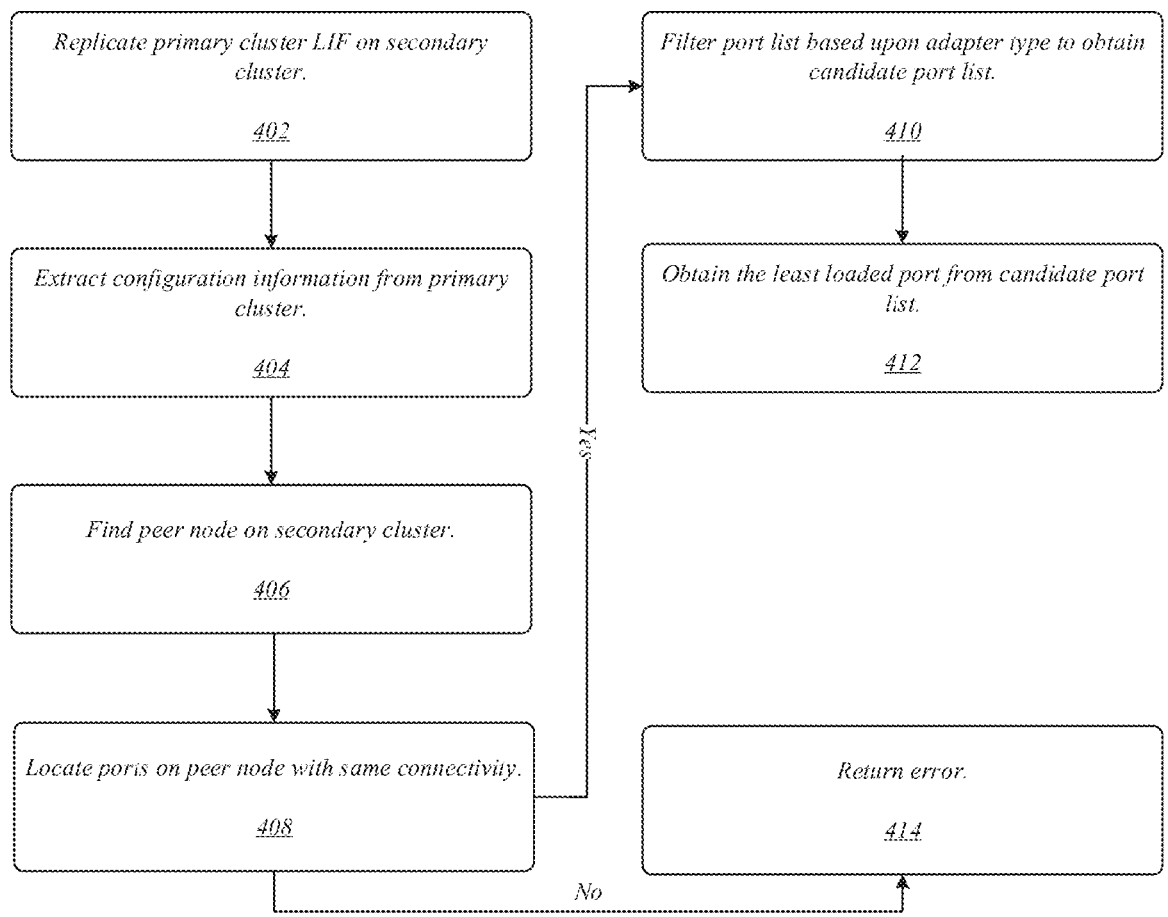
FIG. 4 illustrates an embodiment of a logic flow.

FIG. 4 illustrates a logic flow 400 for LIF placement according to one embodiment. At 402, a SAN LIF may be created on a primary cluster and LIF information corresponding to the new primary cluster LIF may be replicated by a configuration replication module on a secondary cluster. At this point, in response to a SAN LIF creation code, a LIF placement module may be initiated to perform a LIF placement algorithm.

At 404, configuration information, as discussed above, may be extracted from a primary cluster using cross cluster calls or by using contents of a CRS stream.

At 406, a disaster recovery peer node from a secondary cluster that is associated with the LIF created on the primary cluster at 402 is identified. Using this information, at 408, ports may be located on an identified peer node that have the same, or similar, connectivity. For example, ports with common fabric names in FC embodiments, or common subnet-IPspaces in iSCSI embodiments. If such a port is not found, an error is returned at 414.

At 410, a returned list of ports may be filtered based upon an adapter type to obtain a list of candidate ports. At 412, the filtered list may be used to obtain a port to be used for a secondary cluster LIF. The chosen port may be chosen based upon a load of all ports, with a port with the lowest load being chosen. In other embodiments, a port may be chosen such that ports are balanced within the cluster.

Figure 5:
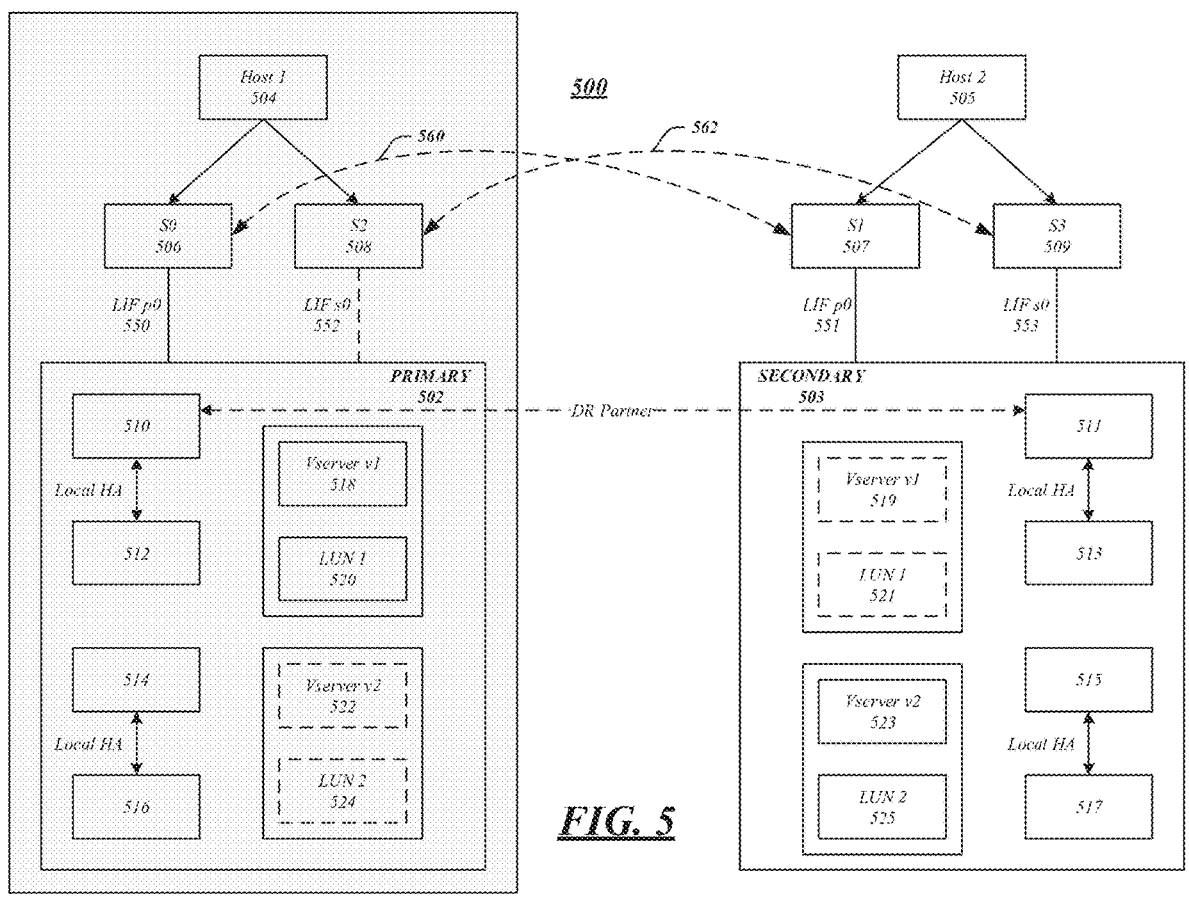
FIG. 5 illustrates an embodiment of a storage area network.

FIG. 5 illustrates an embodiment of the present invention in which SAN 500 has experienced a failure. In particular, the primary cluster side of the SAN (indicated by gray shading) has faced a disaster and an entire site failure. While the components of FIG. 5 correspond generally to like-numbered components of FIG. 3, the illustrated connections have changed due to the site failure. For example, connections 560, 561, and DR Partner connection have failed. In such a failure, the primary cluster 502 as well as the switches 506 and 508, and host 504 have gone down due to a disaster. The LIFs on secondary cluster 503 that are peered with destination Vservers may be brought online into an operational state. If LUN pre-discovery was performed, as described above, active hosts may continue to see the same storage. Prior to a switchover operation, Vserver 518 included LUN 520, which was exposed by LIFs in primary cluster 502. After a switchover operation, hosts connected to secondary cluster 503 may access data from Vserver 518 using LIF 551, for example.

Figure 6:
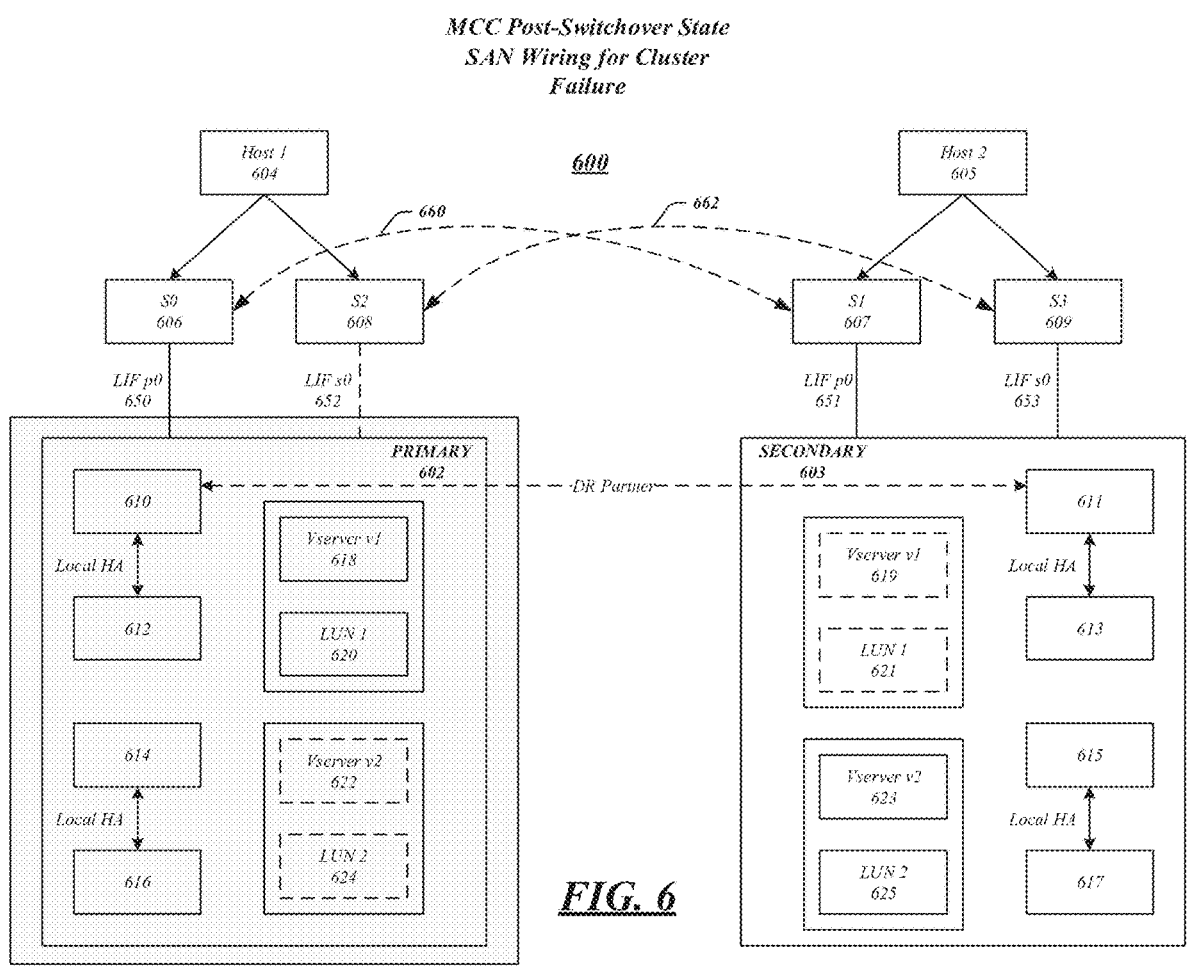
FIG. 6 illustrates an embodiment of a storage area network.

FIG. 6 illustrates an embodiment of the present invention in which SAN 600 has experienced a failure. In particular, the primary cluster side of the SAN (indicated by gray shading) has faced a disaster and a cluster failure. While the components of FIG. 6 correspond generally to like-numbered components of FIG. 3, the illustrated connections have changed due to the site failure. For example, connections 660, 661, and DR Partner connection have failed. In such a failure, the primary cluster 602 has gone down due to a disaster, however, unlike FIG. 5, switches 606 and 608 and host 604 remain operable. The LIFs on secondary cluster 503 that are peered with destination Vservers may be brought online into an operational state. If LUN pre-discovery was performed, as described above, active hosts may continue to see the same storage. Prior to a switchover operation, Vserver 618 included LUN 620, which was exposed by LIFs in primary cluster 602. After a switchover operation, hosts connected to secondary cluster 603 may access data from Vserver 618 using LIF 651, for example.

In some embodiments, a SAN host may have a timeout for host I/O operations (e.g. 60 seconds), after which SCSI initiators start taking recovery actions. The timeout value may differ for different hosts. A switchover operation may be expected to complete in a time period far greater than the host I/O timeout (e.g. 300 seconds). Thus, a switchover may become disruptive to some SAN clients.

Figure 7:
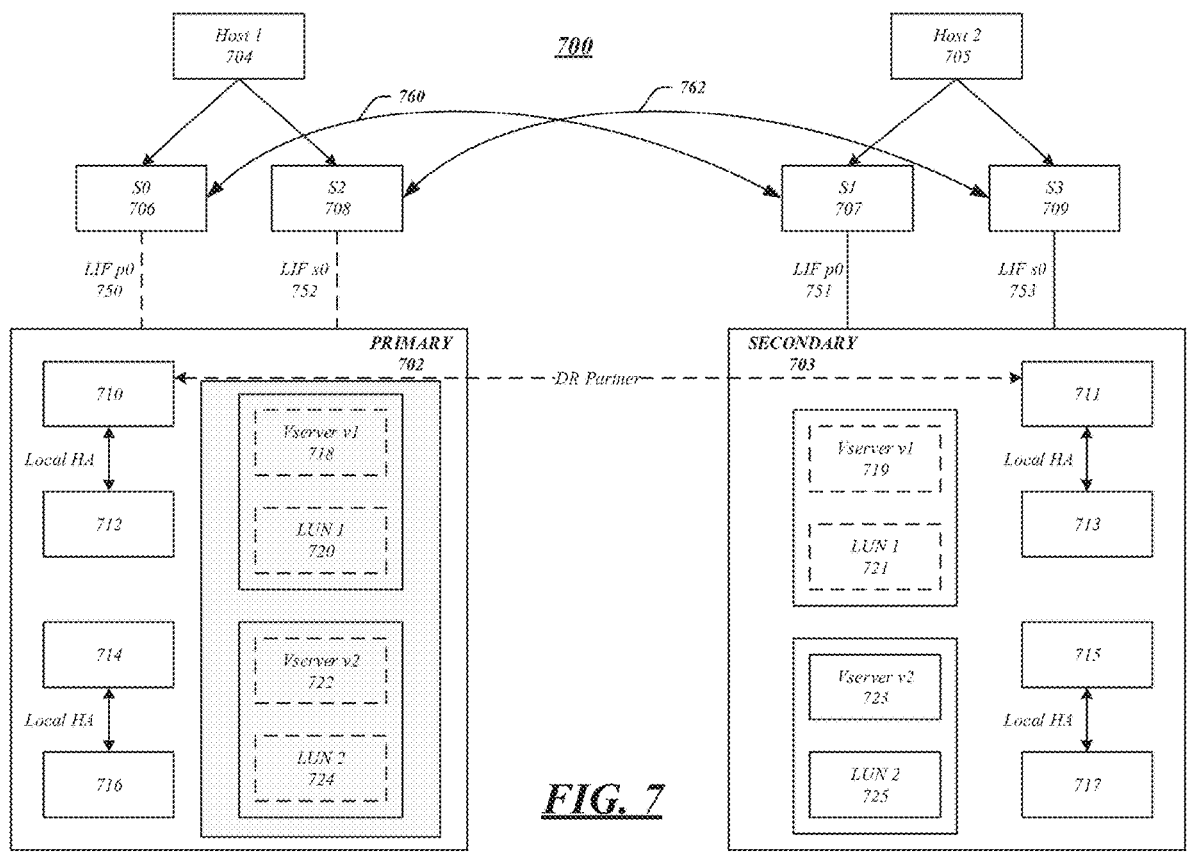
FIG. 7 illustrates an embodiment of a storage area network.

FIG. 7 illustrates an embodiment of the present invention in which SAN 700 has experienced a failure and is in a healing phase. While the components of FIG. 7 correspond generally to like-numbered components of FIG. 3, the illustrated connections have changed due to the site failure, such as connections 760 and 762 being established. A healing phase may be initiated by a module, such as a metrocluster heal-phase aggrs module. During the healing phase, data is resynchronized between primary and secondary clusters and logs from non-mirrored aggregates may be replayed. During the healing phase, nodes within the primary cluster may be kept in a power-down state, only keeping storage components powered on. At the end of a healing phase, all disaster-stricken cluster storage may be visible from a surviving cluster and all storage on a disaster stricken site may be repaired. In addition, degraded mirrored aggregates may begin resynchronizing. These functions may all be performed by a healing module, as described above, which may include software instructions that may be executed by one or more processors within SAN 700.

In some embodiments, controller healing may be initiated by a metrocluster heal-phase roots command in which CFO and root aggregates may be given back to their respective disaster recovery peered nodes. During a root aggregate healing phase, nodes in a primary cluster 702 may be powered on. When these primary cluster nodes are powered up, source Vservers on the primary site may be in a restricted state. A restricted state Vserver may be configuration locked and may not serve data, ensuring that, at any given time, only one site is serving data to hosts.

A healing phase may result in a disaster stricken site coming back online, enabling a viewing of all nodes in both primary and secondary clusters, and source cluster Vservers being in a restricted state. Although root aggregate ownership may change during this process, data aggregates may still be owned by a secondary site. The secondary cluster serving data for both Vservers 719 and 723. Vservers in the primary cluster, indicated by the shading, may not serve data at this point.

SAN 700 may have different roles during a healing phase depending on whether a disaster was merely a power loss, or destruction of equipment. In a power loss situation, the source cluster 702 is not destroyed. As the nodes of the cluster are booted, one or more logic modules may set a bootarg on all the nodes. The Vserver subsystem may not bring up Vservers that were previously the primary of a DR peer relationship. Instead, these Vservers are moved into a restricted state. When a BCOMd module initializes, it may check the Vserver state. If a restricted state is detected, it may ensure that SAN LIFs stay offline and the SAN caches are not populated.

In a destruction, or crater scenario, the primary cluster may be destroyed. In this scenario, the controllers may be replaced and COT may be installed on each controller. A new cluster may be recreated and each node may join the new cluster. In this manner, the cluster and local node configuration may be restored from a peer cluster configuration backup FTP server, which may have been created when the disaster recovery system was configured. The reconfigured cluster may then be peered with secondary cluster 703.

Figure 8:
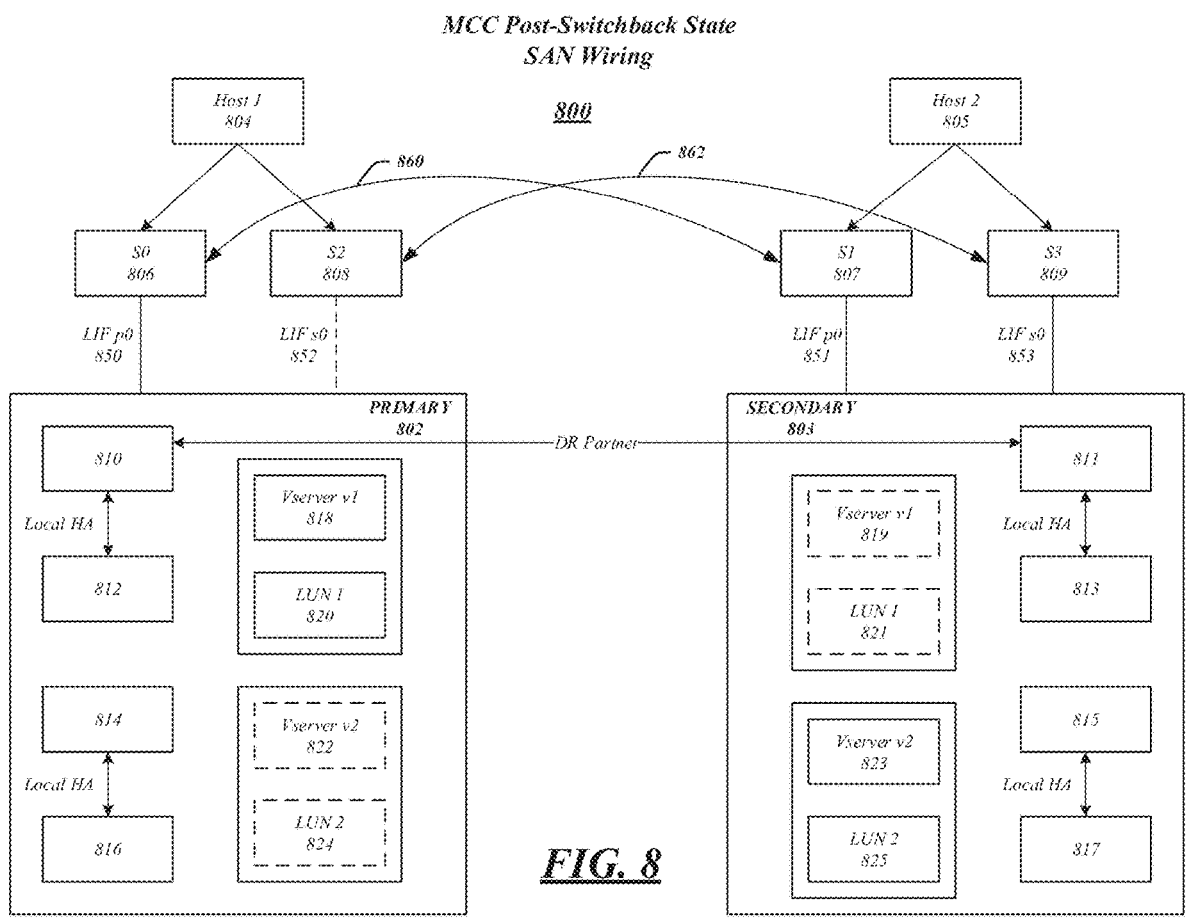
FIG. 8 illustrates an embodiment of a storage area network.

FIG. 8 illustrates SAN 800 according to an embodiment in which a switchback phase has taken place. FIG. 8 is similar to FIG. 3, which illustrates a steady state. There may be pre-requisites for a switchback phases to occur, which may include all aggregates being successfully resynchronized, a completed healing phase, and the disaster-stricken site storage is healed and nodes have been booted. A metrocluster command, which may be used to show nodes, may display all nodes as enabled at this time.

A switchback may occur according to the following timeline of events. At a time T0, primary cluster 802 may be down and, after switchover, destination Vservers at secondary cluster 803 may be serving data. At a time T1, one or more nodes on primary cluster 802 may be booted. Also at T1, Vservers at secondary cluster 803 may continue to serve data as a switchback command is initiated, which will fence off configuration updates for mcc_dst Vservers, flip the direction of CRS replication, and kickoff CRS re-baseline at a time T2. Also at T2, Vservers at primary cluster 802 may be placed in a restricted state.

At time T3, after RDB replication is completed for all the source Vservers, a SAN API may be called at SAN 800, which is used to populate a SAN cache for the primary cluster Vservers. During time T3, secondary cluster Vservers may continue to serve data.

At a time T4, a precheck on the primary cluster may take place, which determines whether a switchback operation can be completed. Also at time T4, Vservers at a secondary cluster continue to serve data.

At a time T5, Ownership of a D-blade of the plex may be changed. Volume online notifications may be generated by WAFL to VDOM to a SCSI Blade. BCOMKA may start pulling LUN attrs from VDOM at this time. Also at time T5 at the secondary cluster, since storage is pulled while one or more LIFs are still up, WAFL may return either EOFFLINE or ENOVOL depending on ops and protocols for I/Os during and after an ownership change.

At time T6, volumes and LUn configuration population may be complete at a primary cluster. At this point, SAN 800 may send a notification to the active job. Also at time T6, the secondary cluster Vservers may continue to serve data on remaining aggregates.

At a time T7, a primary cluster may complete SAN configuration for volumes and LUNs for a recovering Vserver and the Vserver may be restarted at a time T8. This may repeat for all affected Veservers in a primary cluster. Also at time T7, secondary cluster Vservers may be moved to a restricted state. LIFs in the secondary cluster may go offline at this time. The RTO window (e.g. 120 seconds) may have started earlier, at time T5, for example, when ownership of the first plex has changed. A SAN API may also be called to purge SAN caches at time T7. As previously mentioned, at time T8, Vservers at a primary cluster may be started. Starting of a Vserver may only proceed once it has been verified that a corresponding peer Vserver in a secondary cluster is in restricted state. Also at time T8, all Vservers at a secondary cluster are placed in a restricted state.

It may be noted that between times T7 and T8, SCSI initiators may have no paths to LUNs in the primary cluster as Vservers are brought online. Thus, it may be desirable to minimize these stages as to cause minimum disruption to connected hosts.

As discussed above, SAN 800 may play a role during the switchback procedure in both primary and secondary clusters. For example, on the primary cluster, a SAN API may be used to populate SAN caches for source servers (mentioned above at time T3). This may result in BCOMKA joining the Vserver group on all the nodes. The volume groups may be empty since the volumes may not have appeared on a D-blade within the primary cluster. When volumes do appear in a D-blade (at time T5), WAFL may notify VDOM, which will in turn notify BCOMKA. SCSIT LU groups may be set up at this time and volume groups may be populated while BCOMKA may pull LUN attributes from VDOM.

In some embodiments, a wipe configuration module (not shown) may be utilized to clear configuration data from nodes in a disaster recovery group. Cleared nodes may include a specified node, its HA partner, its DR peer, and its DR auxiliary. Nodes in a DR group may be disallowed from participating in a metrocluster switchover discussed above and storage failover commands after configuration data has been wiped. This command may be used to tear down a metrocluster setup and is complete when the hardware responsible for activating a node, such as a FC-VI adapter, is removed or deactivated. Further, the wipe command may be used to reclaim nodes. In an embodiment, a wipe command may identify Vservers of subtype sync-destination and delete identified Versver's configurations.

Figure 9:
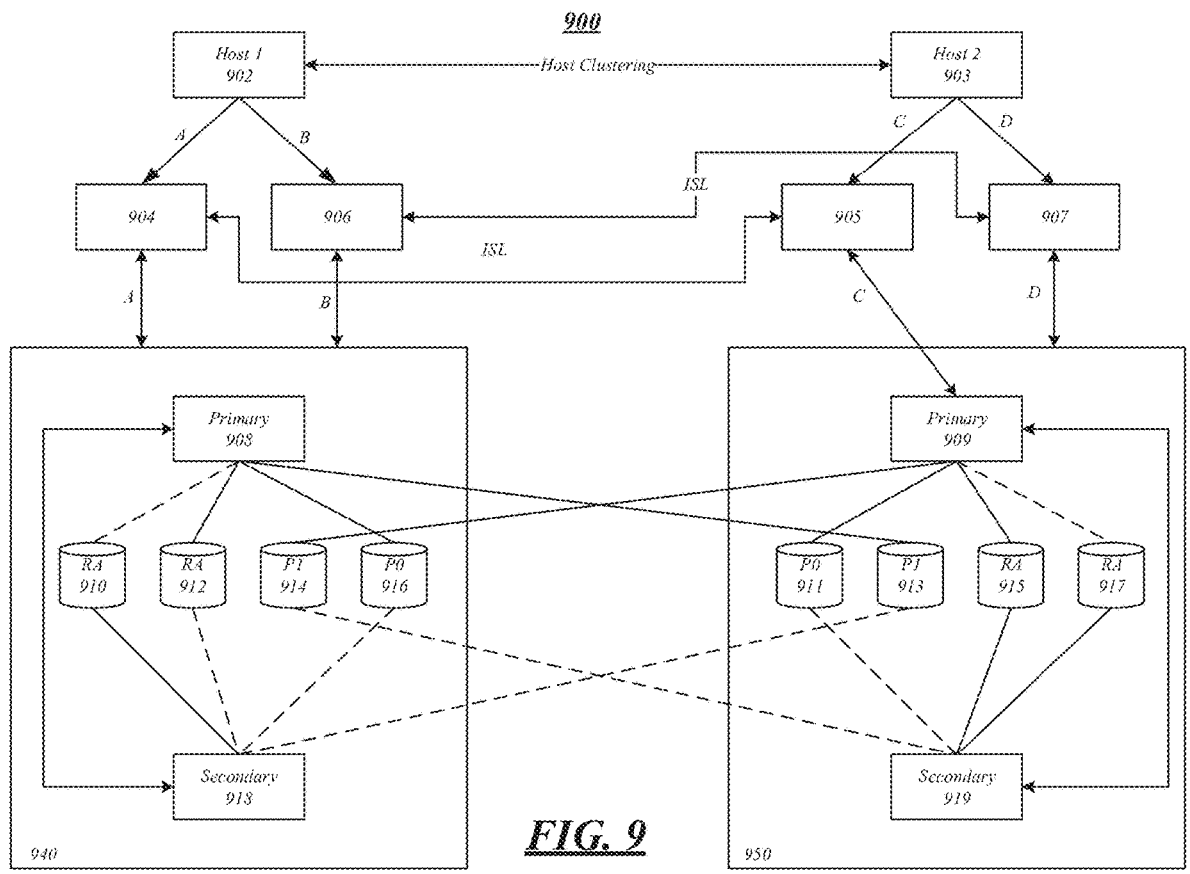
FIG. 9 illustrates an embodiment of a storage area network.

FIG. 9 illustrates a SAN 900 according to an embodiment. Before a disaster, a host 902 or 903 may access one or more volumes of a primary Vserver, such as 908 or 909, which are available in a primary plex. After a switchover operation, a host may access the volumes, such as 910-916 and 911-917, which have been mirrored on a secondary plex. As stated above, hosts at the secondary cluster for a Vserver would have pre-discovered LUNs in a primary Vserver. After the switchover operation, hosts at the secondary site may see the same LUNs since the target and LUN identities may be preserved. In the illustrated embodiments switches 904, 906, 905, and 907 may be either FC or IP.

As illustrated, during normal operation, host 902 may access storage 916 via switch 904 and interconnects A during normal operation. Likewise, during normal operation, host 903 may access storage 911 via switch 907 and interconnects D. During a failure of site 940, host 903 may access storage 913 via switch 905 and interconnects C. During a failure of site 950, host 902 may access storage 914 via switch 906 and interconnects B.

FIG. 10 illustrates an embodiment of a storage medium 1000. Storage medium 1000 may comprise any non-transitory computer-readable storage medium or machine-readable storage medium, such as an optical, magnetic or semiconductor storage medium. In various embodiments, storage medium 1000 may comprise an article of manufacture. In some embodiments, storage medium 1000 may store computer-executable instructions, such as computer-executable instructions to implement the logic flows described herein. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
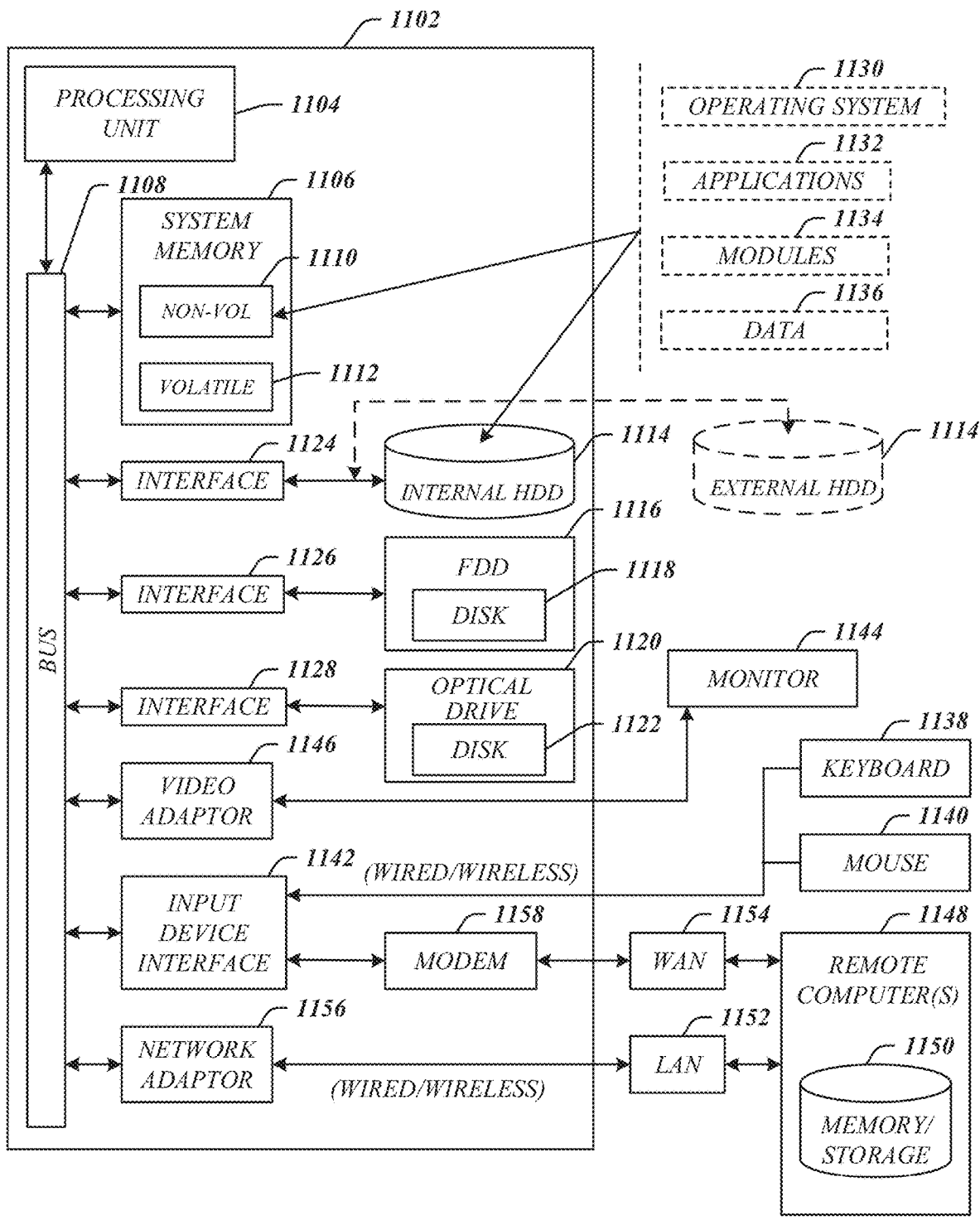
FIG. 11 illustrates an embodiment of a computing architecture.

FIG. 11 illustrates an embodiment of an exemplary computing architecture 1100 suitable for implementing various embodiments as previously described. In various embodiments, the computing architecture 1100 may comprise or be implemented as part of an electronic device. In some embodiments, the computing architecture 1100 may be used, for example, to implement the systems, logic flows, and articles described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the described systems.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
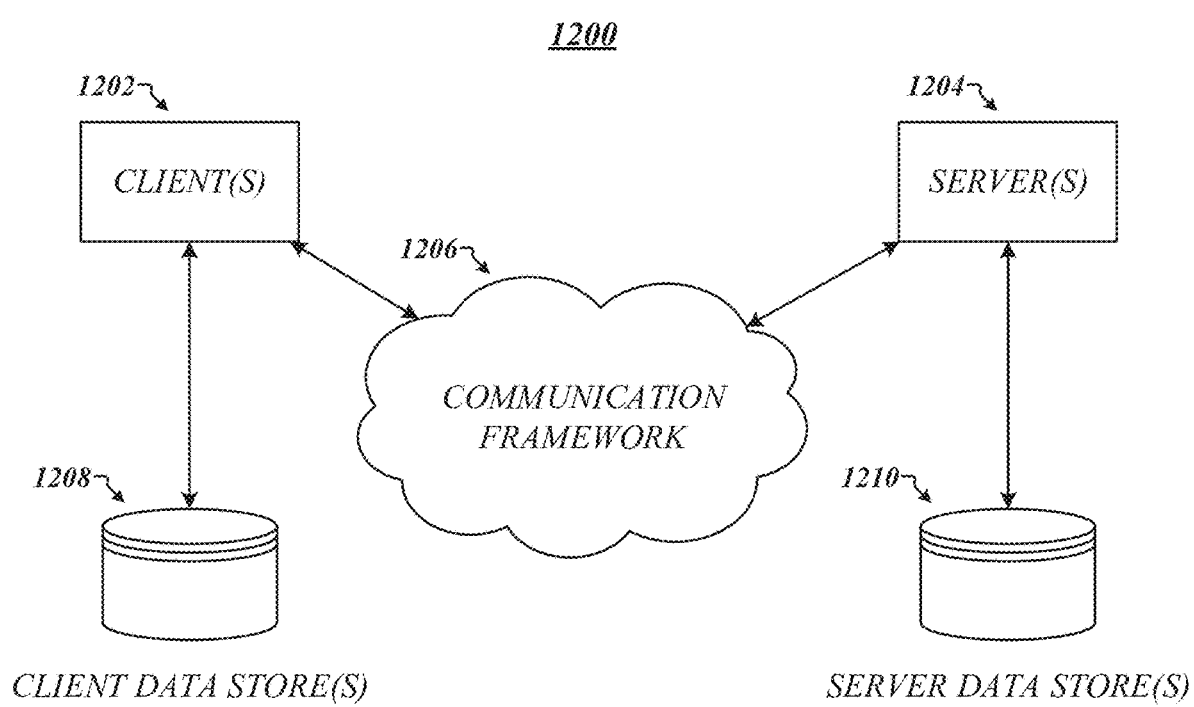
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 and the servers 1204 are operatively connected to one or more respective client data stores 1208 and server data stores 1210 that can be employed to store information local to the respective clients 1202 and servers 1204, such as cookies and/or associated contextual information. Any one of clients 1202 and/or servers 1204 may implement the apparatuses, systems, methods, and articles described herein in conjunction with storage of information on any of client data stores 1208 and/or server data stores 1210.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   creating, by a processor, a relationship between a primary and a secondary cluster of a storage area network, the primary and secondary clusters having a plurality of nodes and a plurality of storage devices for storing data;
   wherein based on the relationship, a first virtual server corresponding to a first node of the primary cluster and a second virtual server corresponding to a second node of the secondary cluster are automatically configured to operate as high-availability peer nodes executing same processes for disaster recovery, the first virtual server providing storage access to a host via an assigned logical interface (LIF) in an operational state, while the second virtual server operates in a restricted state which limits host access to storage via the second virtual server, while the first virtual server operates in the operational state;

mapping the LIF to the second virtual server of the second node, upon validation of the LIF; wherein the mapped LIF is unavailable to obtain storage access during the restricted state of the second virtual server;

configuring a second logical storage object for the second virtual server at the second node using a same number of paths used to access a first logical storage object of the first virtual server at the first node; wherein the first and second logical storage objects have a same configuration for storing data;

validating a detected change in configuration of the first logical storage object;

applying the detected change to the second logical storage object; and modifying the restricted state of the second virtual server to the operational state to provide non-disruptive storage access to the host via the mapped LIF, when the first virtual server becomes unavailable.

2. The method of claim 1, wherein the LIF is mapped to a port of an adapter of the second node with connectivity similar to port connectivity for a port of the first node.

3. The method of claim 1, wherein the processor executes a command at the primary cluster and the secondary cluster to automatically generate the first and second virtual servers, each with an attribute indicating that the first virtual server is a source and the second virtual server is a destination for enabling disaster recovery.

4. The method of claim 1, wherein when the second virtual server operates in the restricted state, then a storage volume available for storing data via the first storage server is unavailable via the second virtual server.

5. The method of claim 4, wherein upon disaster recovery when the second virtual server operates in the operational state, then access to the storage volume is unavailable through the first virtual server.

6. The method of claim 1, wherein the restricted state of the second virtual server is changed to the operational state without rebooting the second node.

7. The method of claim 1, wherein each node of the primary cluster and each node of the secondary cluster are connected using a common fabric to enable a switchover operation and transfer of a storage aggregate from the first node to the second node.

8. A non-transitory machine readable storage medium having stored thereon instructions for performing a method, comprising machine executable code which when executed by at least one machine, causes the machine to:

create, by a processor, a relationship between a primary and a secondary cluster of a storage area network, the primary and secondary clusters having a plurality of nodes and a plurality of storage devices for storing data;

wherein based on the relationship, a first virtual server corresponding to a first node of the primary cluster and a second virtual server corresponding to a second node of the secondary cluster are automatically configured to operate as high-availability peer nodes executing same processes for disaster recovery, the first virtual server providing storage access to a host via an assigned logical interface (LIF) in an operational state, while the second virtual server operates in a restricted state which limits host access to storage via the second virtual server, while the first virtual server operates in the operational state;

map the LIF to the second virtual server of the second node, upon validation of the LIF; wherein the mapped LIF is unavailable to obtain storage access during the restricted state of the second virtual server;

configure a second logical storage object for the second virtual server at the second node using a same number of paths used to access a first logical storage object of the first virtual server at the first node; wherein the first and second logical storage objects have a same configuration for storing data;

validate a detected change in configuration of the first logical storage object;

apply the detected change to the second logical storage object; and modify the restricted state of the second virtual server to the operational state to provide non-disruptive storage access to the host via the mapped LIF, when the first virtual server becomes unavailable.

9. The non-transitory machine readable storage medium of claim 8, wherein the LIF is mapped to a port of an adapter of the second node with connectivity similar to port connectivity for a port of the first node.

10. The non-transitory machine readable storage medium of claim 8, wherein the processor executes a command at the primary cluster and the secondary cluster to automatically generate the first and second virtual servers, each with an attribute indicating that the first virtual server is a source and the second virtual server is a destination for enabling disaster recovery.

11. The non-transitory machine readable storage medium of claim 8, wherein when the second virtual server operates in the restricted state, then a storage volume available for storing data via the first storage server is unavailable via the second virtual server.

12. The non-transitory machine readable storage medium of claim 11, wherein upon disaster recovery when the second virtual server operates in the operational state, then access to the storage volume is unavailable through the first virtual server.

13. The non-transitory machine readable storage medium of claim 8, wherein the restricted state of the second virtual server is changed to the operational state without rebooting the second node.

14. The non-transitory machine readable storage medium of claim 8, wherein each node of the primary cluster and each node of the secondary cluster are connected using a common fabric to enable a switchover operation and transfer of a storage aggregate from the first node to the second node.

15. A system, comprising:

a memory containing machine readable medium comprising machine executable code having stored thereon instructions; and a processor coupled to the memory to execute the machine executable code to create a relationship between a primary and a secondary cluster of a storage area network, the primary and secondary clusters having a plurality of nodes and a plurality of storage devices for storing data;

wherein based on the relationship, a first virtual server corresponding to a first node of the primary cluster and a second virtual server corresponding to a second node of the secondary cluster are automatically configured to operate as high-availability peer nodes executing same processes for disaster recovery, the first virtual server providing storage access to a host via an assigned logical interface (LIF) in an operational state, while the second virtual server operates in a restricted state which limits host access to storage via the second virtual server, while the first virtual server operates in the operational state;

map the LIF to the second virtual server of the second node, upon validation of the LIF; wherein the mapped LIF is unavailable to obtain storage access during the restricted state of the second virtual server;

configure a second logical storage object for the second virtual server at the second node using a same number of paths used to access a first logical storage object of the first virtual server at the first node; wherein the first and second logical storage objects have a same configuration for storing data;

validate a detected change in configuration of the first logical storage object;

apply the detected change to the second logical storage object; and modify the restricted state of the second virtual server to the operational state to provide non-disruptive storage access to the host via the mapped LIF, when the first virtual server becomes unavailable.

16. The system of claim 15, wherein the LIF is mapped to a port of an adapter of the second node with connectivity similar to port connectivity for a port of the first node.

17. The system of claim 15, wherein the processor executes a command at the primary cluster and the secondary cluster to automatically generate the first and second virtual servers, each with an attribute indicating that the first virtual server is a source and the second virtual server is a destination for enabling disaster recovery.

18. The system of claim 15, wherein when the second virtual server operates in the restricted state, then a storage volume available for storing data via the first storage server is unavailable via the second virtual server.

19. The system of claim 18, wherein upon disaster recovery when the second virtual server operates in the operational state, then access to the storage volume is unavailable through the first virtual server.

20. The system of claim 15, wherein each node of the primary cluster and each node of the secondary cluster are connected using a common fabric to enable a switchover operation and transfer of a storage aggregate from the first node to the second node.

* * * * *